US012138206B2

(12) United States Patent
Sioufi

(10) Patent No.: US 12,138,206 B2
(45) Date of Patent: Nov. 12, 2024

(54) ERGONOMIC SEAT APPARATUS

(71) Applicant: Services Médicaux Georges Sioufi Inc., Montreal (CA)

(72) Inventor: Georges Sioufi, Montreal (CA)

(73) Assignee: Services Médicaux Georges Sioufi Inc., Montreal (CA)

( * ) Notice: Subject to any disclaimer, the term of this patent is extended or adjusted under 35 U.S.C. 154(b) by 155 days.

(21) Appl. No.: 17/786,477

(22) PCT Filed: Dec. 17, 2020

(86) PCT No.: PCT/CA2020/051736
§ 371 (c)(1),
(2) Date: Jun. 16, 2022

(87) PCT Pub. No.: WO2021/119820
PCT Pub. Date: Jun. 24, 2021

(65) Prior Publication Data

US 2023/0029128 A1 Jan. 26, 2023

Related U.S. Application Data

(60) Provisional application No. 62/949,056, filed on Dec. 17, 2019.

(51) Int. Cl.
*A61G 5/14* (2006.01)
*A61G 5/12* (2006.01)

(52) U.S. Cl.
CPC ............... *A61G 5/14* (2013.01); *A61G 5/122* (2016.11); *A61G 5/124* (2016.11)

(58) Field of Classification Search
CPC ........ A47D 13/102; A61G 5/14; A61G 5/124; A61G 5/122

(Continued)

(56) References Cited

U.S. PATENT DOCUMENTS 3,479,087 A 11/1969 Burke
5,375,910 A 12/1994 Murphy
(Continued)

FOREIGN PATENT DOCUMENTS

CN 204055438 U * 12/2014

OTHER PUBLICATIONS

International Search Report mailed Mar. 10, 2021, for priority International Patent Application No. PCT/CA2020/051736.
(Continued)

*Primary Examiner* — Milton Nelson, Jr.
(74) *Attorney, Agent, or Firm* — Renner, Otto, Boisselle & Sklar, LLP

(57) ABSTRACT

A seat apparatus for facilitating movement of a user from a sitting position to a standing position is provided. The seat apparatus includes a main body having a bottom surface, a back wall and a pair of lateral walls which are connected together and define a recessed region configured for sitting in. The main body further includes a seat projection extending upwardly from the bottom surface, between the lateral walls, whereby the seat projection is shaped and adapted to maintain thighs of a user separated on either side thereof. The seat apparatus also comprises a base provided below the main body and adapted to cooperate therewith. At least one of the base and main body has a convex and curved cross-sectional profile adapted to allow the apparatus to pivot about at least one axis in order to tilt the main body forward and urge a user in the standing position.

14 Claims, 16 Drawing Sheets

(58) Field of Classification Search
USPC .................................................... 297/256.16
See application file for complete search history.

(56) References Cited

U.S. PATENT DOCUMENTS

| | | | | |
|---|---|---|---|---|
| 5,630,648 | A | 5/1997 | Allard et al. | |
| 5,742,957 | A | 4/1998 | Vanzant | |
| 5,918,936 | A | 7/1999 | Murphy | |
| D413,980 | S | 9/1999 | Sioufi | |
| 6,033,019 | A * | 3/2000 | Hession-Kunz ....... | A47D 1/002 297/256.13 |
| 6,505,887 | B2 * | 1/2003 | Hampton ................ | B60N 2/06 297/256.16 |
| 6,702,383 | B2 | 3/2004 | Newman et al. | |
| 7,201,445 | B1 * | 4/2007 | Dubiel .................. | A47D 1/103 297/256.13 |

OTHER PUBLICATIONS

Written Opinion mailed Mar. 10, 2021, for priority International Patent Application No. PCT/CA2020/051736.

* cited by examiner

ERGONOMIC SEAT APPARATUS

This application is a national phase of International Application No. PCT/CA2020/051736 filed Dec. 17, 2020, which claims priority to U.S. Provisional Patent Application No. 62/949,056 filed Dec. 17, 2019, each of which is hereby incorporated herein by reference in its entirety.

FIELD OF THE INVENTION

The present disclosure generally relates to the field of ergonomic seating apparatus, and more particularly to a seating apparatus for assisting a person with reduced mobility.

BACKGROUND

Devices and/or products such as prostheses and/or orthoses for assisting in a person's rehabilitation are well known in the art. Indeed, most of these products are useful to assist people during recovery and/or to reduce recovery time of patients after an accident or a surgery, for example. As such, patients can return to a more autonomous lifestyle faster.

Some medical devices can be configured to assist people having reduced mobility, such as temporary loss of mobility (e.g., recovery from accident) or a permanent loss of mobility (e.g., loss of limb(s)). Reduced mobility can occur as a result from an operation or surgery for a knee prosthesis, a hip prosthesis, surgery of the pelvis or of the back, for example. Other cases of reduced mobility can occur in relation with degenerative diseases which can cause loss of muscle mass, resulting in loss of physical abilities and autonomy, for example in elderly people.

It is also known in the art that joints of the human body, such as knees or hip joints, can undergo pressures up to 2 to 2.5 times greater than the weight of the entire body due to the forces of gravity. Indeed, the pressures acting on these joints can double when moving vertically (e.g., going from a seated position to a standing position). As such, patients with reduced mobility, especially in the lower limbs, can have difficulty performing certain movements and/or doing certain actions without the help of a product, such as crutches, a prosthesis, an orthosis, or simply from another person.

Despite various improvements over the years in the medical arts, there is currently little or no devices available which can assist a person in moving from a seated position to a standing position in a partially and/or completely autonomous manner. More particularly, patients who are in rehabilitation, for example, following a replacement surgery have to, after sitting for the first time in their hospital ward or convalescent chair, get up with the help of caregivers. They are verticalized (i.e., stood up) at the expense of the non-operated limbs, such as their arms. The stability and balance achieved at the end of this ascent phase then allows the walker to be properly grasped in order to safely begin their first steps.

The challenge for the patients is to produce the necessary effort/force (e.g., with non operated limbs), almost spontaneously, for verticalization from sitting to standing. This distance can be estimated at about 0.5 meters. The challenge can increase as the patient gets older since muscle mass can decrease with age, thus further limiting physical capabilities.

There is thus always a need to continue innovating and finding better and/or different ways of manufacturing, assembling and/or operating components of medical devices/products or other related components.

Indeed, it would be particularly advantageous to provide an apparatus, such as a seating apparatus for assisting a user in a more efficient, more precise, more accurate, more reliable, more adjustable, more versatile, more adaptable, more ergonomic and/or more desirable manner, than what is possible with available products and devices.

Thus, it would be particularly useful to be able to provide such an improved apparatus which would be able to overcome or at the very least minimize some of known drawbacks and/or deficiencies associated with conventional methods and/or devices, for example.

SUMMARY OF THE INVENTION

An object of the present invention is to provide a seat apparatus which, by virtue of its design and components, would be an improvement over other related conventional devices, orthoses and/or methods known in the prior art.

In accordance with the present invention, the above object is achieved, as will be easily understood from the present description, with a seat apparatus (also referred to herein simply as "seat" or "apparatus") such as the one briefly described herein and such as the one exemplified in the accompanying drawings.

More particularly, according to one aspect of the present invention, an object is to provide a seat apparatus to be used with a seat or sitting location, the apparatus comprising a main body being positionable onto the seat or sitting location for cooperating therewith, the main body of the apparatus having a bottom surface, a back wall and a pair of lateral walls, the bottom surface, back wall and lateral walls being connected together and defining a recessed region configured for sitting in, the main body further comprises a seat projection extending upwardly from the bottom surface between the lateral walls, the seat projection being shaped and configured to keep the legs of a user separated on either side thereof; a base provided below the main body and being connected thereto, the base having a convex and curved cross-sectional profile adapted to allow the apparatus to pivot about at least one axis, the base comprises at least one receded front corner adapted to allow the apparatus to tilt in the direction of the at least one receded front corner.

According to one possible embodiment, the apparatus further includes a latching mechanism configured to fasten the apparatus to the seat or sitting location. The latching mechanism comprising a passage extending transversely through the main body and/or the base, and a strap extendable through the passage for fastening the apparatus to the seat or sitting location.

According to one possible embodiment, the recessed region includes a lumbar section proximate the back wall, a buttocks section provided below the lumbar section for receiving a buttocks of a user, and a pair of thigh sections extending forwardly from the buttocks section for receiving thighs of the user.

According to one possible embodiment, the lumbar section comprises a protruding component adapted to contact, support and/or provide comfort to the lumbar region of the user According to one possible embodiment, the seat projection is located in between the thigh sections and substantially in the middle thereof.

According to one possible embodiment, the seat projection extends forwardly further than the lateral walls.

According to one possible embodiment, the passage of the latching mechanism extends through a center of gravity of the apparatus.

According to one possible embodiment, a left side of the seat apparatus is substantially symmetrical relative to a right side of the seat apparatus.

According to yet another aspect of the invention, there is also provided a method of manufacturing components of the above-mentioned apparatus.

According to yet another aspect of the invention, there is also provided a method of assembling components of the above-mentioned apparatus.

According to yet another aspect of the invention, there is also provided a method of using the above-mentioned apparatus, and/or component(s) thereof.

According to yet another aspect of the invention, there is also provided a kit with components for assembling the above-mentioned apparatus.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned apparatus, component(s) thereof, kit, set and/or method(s).

According to a second aspect, there is provided a seat apparatus for facilitating movement of a user from a sitting position to a standing position. The seat apparatus comprising a main body comprising a bottom surface, a back wall and a pair of lateral walls, the bottom surface, back wall and lateral walls being connected together and defining a recessed region configured for sitting in, the main body further comprising a seat projection extending upwardly from the bottom surface between the lateral walls, the seat projection being shaped and adapted to maintain thighs of a user separated on either side thereof; and a base provided below the main body and adapted to cooperate therewith, at least one of the base and main body comprising a convex and curved cross-sectional profile adapted to allow the apparatus to pivot about at least one axis in order to tilt the main body forward and urge a user in the standing position.

According to one possible embodiment, the base comprises at least one receded portion proximate a front of the seat apparatus adapted to allow the main body to tilt in the direction of the at least one receded portion.

According to one possible embodiment, the recessed region includes a lumbar section proximate the back wall, a buttocks section provided below the lumbar section and adapted to receive a buttocks of a user, and a pair of thigh sections extending forwardly from the buttocks section and adapted to receive thighs of the user.

According to one possible embodiment, the lumbar section comprises a protruding component adapted to contact and support a lumbar region of the user when sitting in the seat apparatus.

According to one possible embodiment, the seat projection is located between the thigh sections.

According to one possible embodiment, the seat projection extends forwardly further than the lateral walls.

According to one possible embodiment, the main body comprises a body interface, and the base comprises a base interface, and wherein the body interface is adapted to slidably engage the base interface.

According to one possible embodiment, the body interface is generally convex and the base interface is generally concave and adapted to cradle the body interface.

According to one possible embodiment, the base interface and body interface are complementarily shaped.

According to one possible embodiment, the main body comprises at least one receded portion adapted to allow the main body to tilt in the direction of the at least one receded portion.

According to one possible embodiment, the base comprises a forward base portion, and wherein the receded portion of the main body comprises a pair of receded portion overhanging on either side of the forward base portion.

According to one possible embodiment, the seat apparatus further comprises a latching mechanism configured to fasten the seat apparatus to a supporting surface, the latching mechanism comprising a passage extending transversely through at least one of the main body and the base; and a fastener adapted to extend through the passage for fastening the seat apparatus to supporting surface.

According to one possible embodiment, the passage extends through a center of gravity of the apparatus.

According to one possible embodiment, the passage is a body passage adapted to extend through a thickness of the main body, and wherein the latching mechanism further comprises a base passage extending through a thickness of the base, each passage being adapted to receive respective fasteners for connecting the main body, the base and the supporting surface to one another.

The objects, advantages, and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
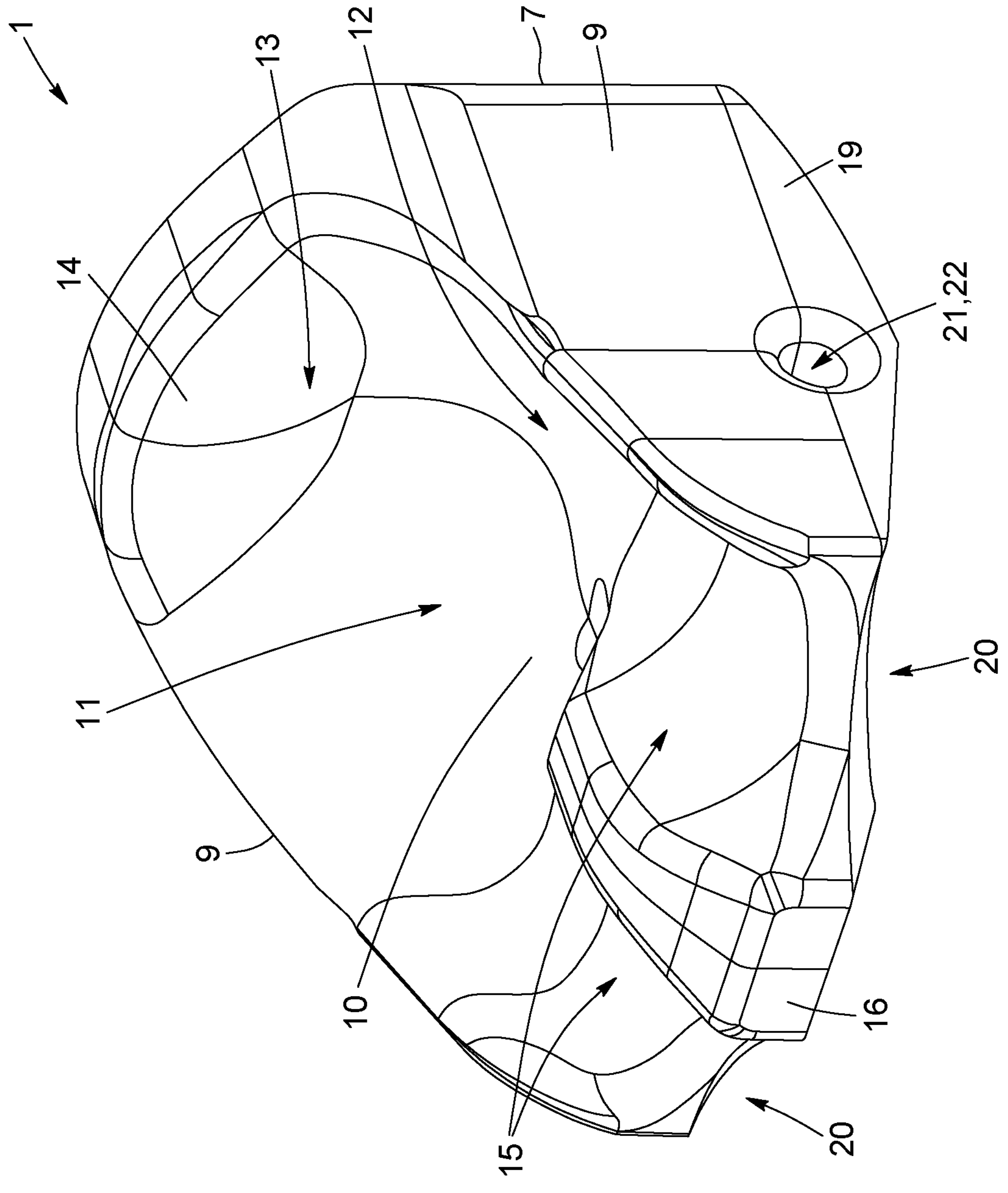
FIG. 1 is a perspective view of a seat apparatus according to an embodiment, showing a recessed region defined in a main body of the seat.
Figure 2:
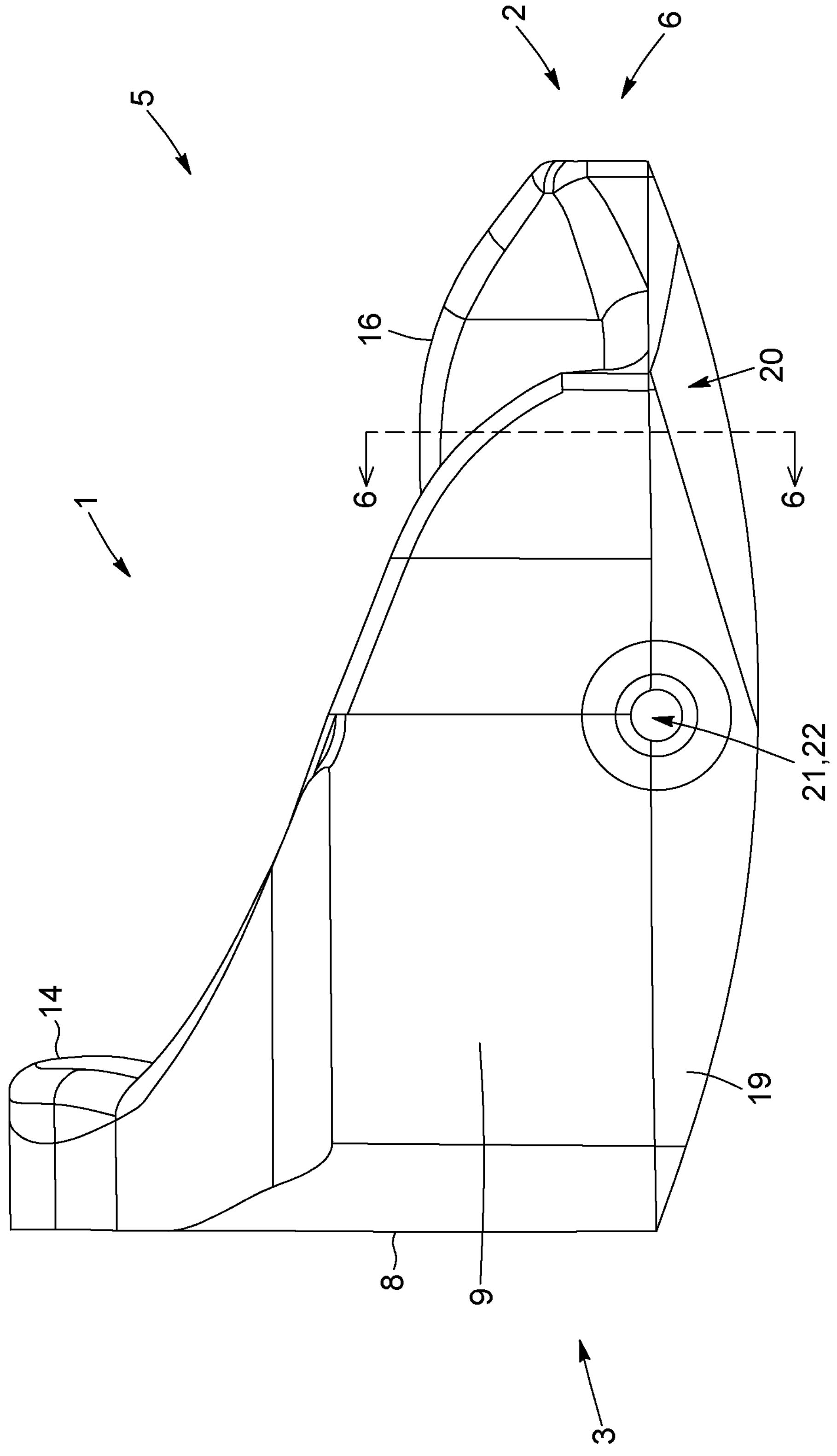
FIG. 2 is a side elevation view of the seat apparatus shown in FIG. 1, showing a back wall extending further upwardly than the lateral walls, and a passage extending transversely through the seat apparatus, according to an embodiment.
Figure 3:
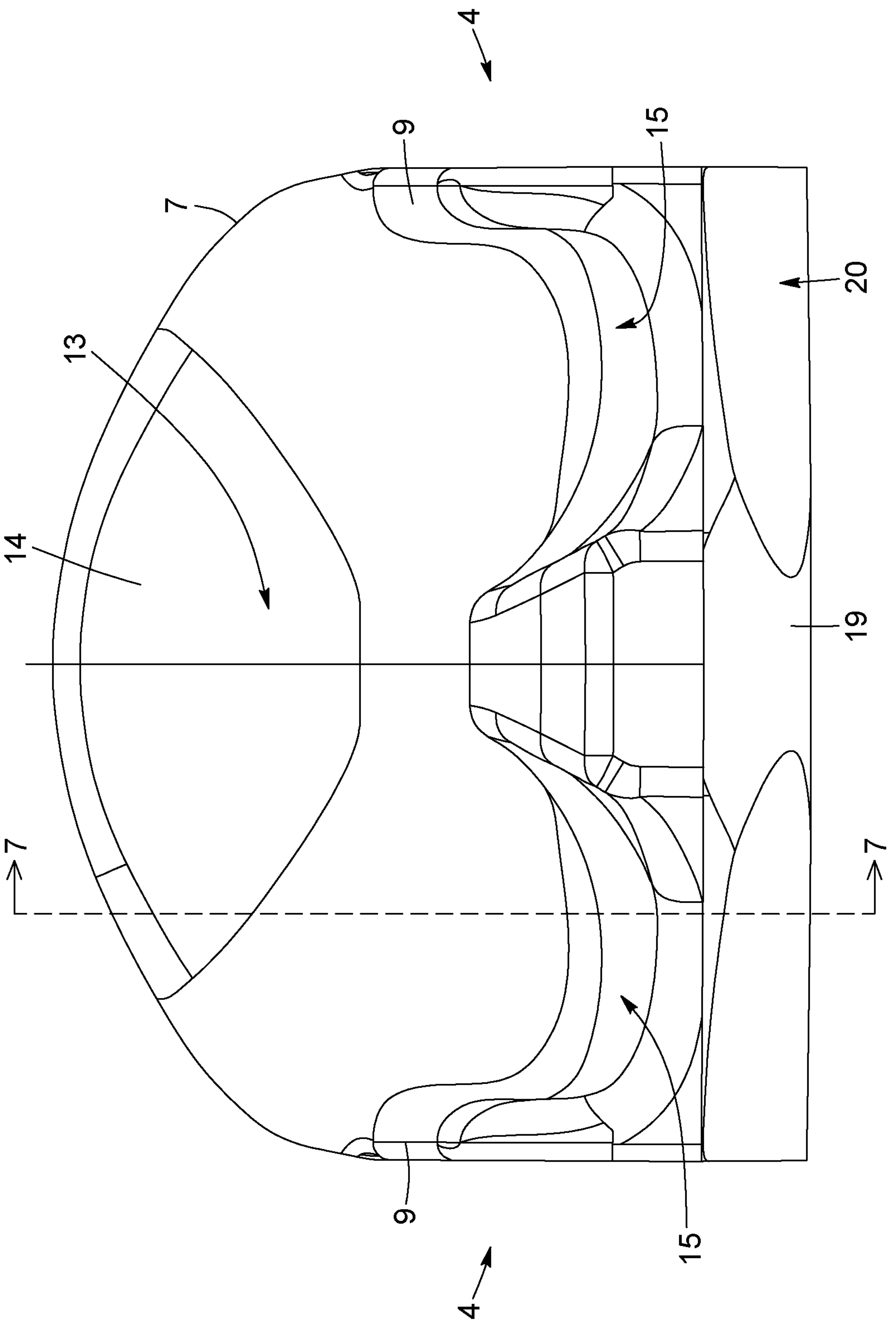
FIG. 3 is a front elevation view of the seat apparatus shown in FIG. 1, showing a base provided below the main body, according to an embodiment.
Figure 4:
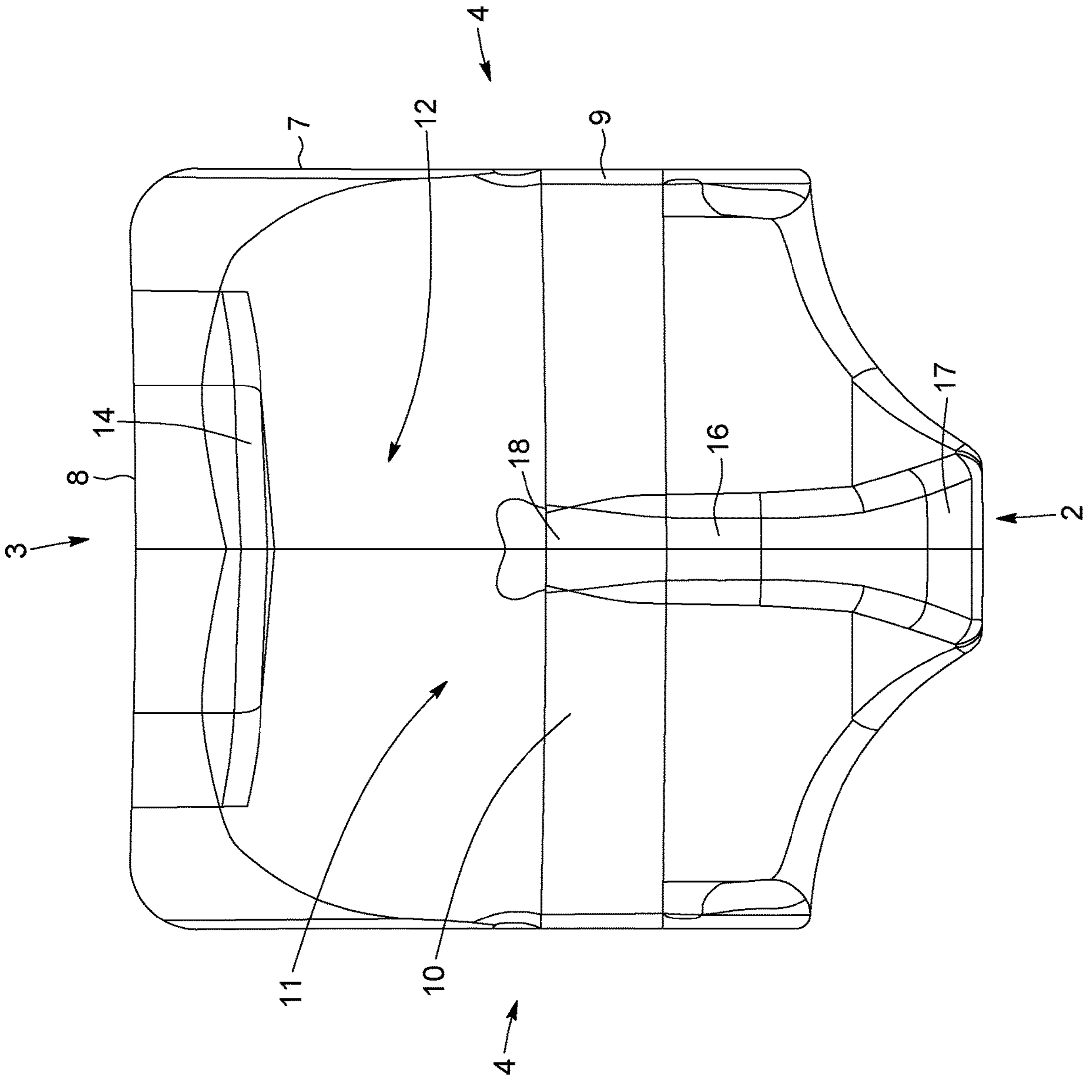
FIG. 4 is a top elevation view of the seat apparatus shown in FIG. 1, showing a seat projection extending further forwardly than the lateral walls, according to a possible embodiment.
Figure 5:
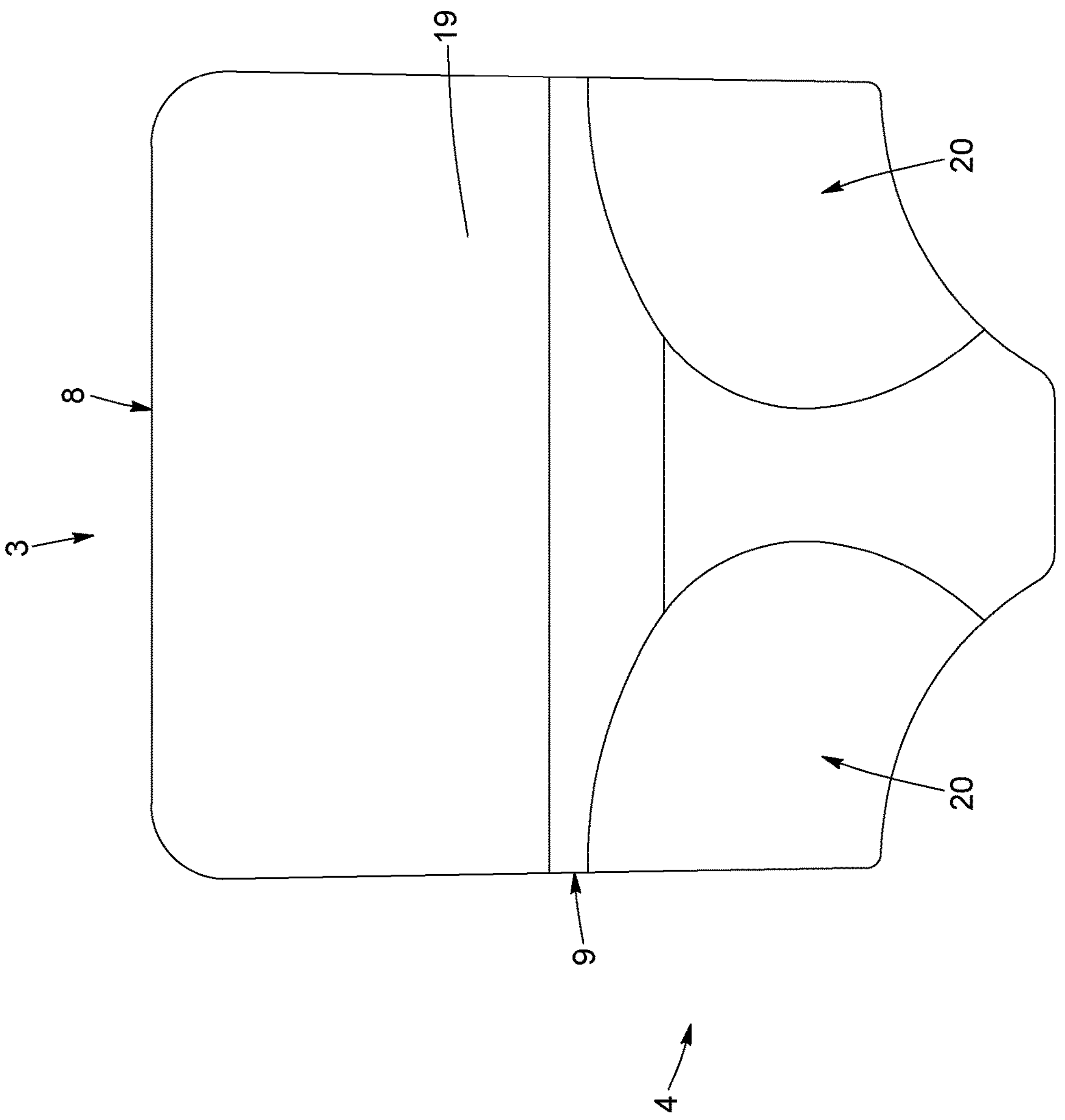
FIG. 5 is a bottom plan view of the seat apparatus according to an embodiment, showing a pair of receded front corners.

In the following description, the same numerical references refer to similar elements. In addition, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Furthermore, although the various exemplary embodiments described herein may be used in relation with a seat apparatus adapted to assist a person with reduced mobility, for example, it is understood that it may be used with other types of seats, seating arrangements and/or for other purposes. For this reason, the term “seat” as used herein should not be taken as to limit the scope of the present disclosure as being used for assisting a person with reduced mobility in particular. It should be understood that the term “seat” should, in the context of the present disclosure, encompass all other types of seats and/or arrangements with which the described embodiments could be used and may be useful.

Moreover, in the context of the present disclosure, the expressions “seat”, “prosthesis”, “gadget”, “orthosis”, “attachment”, “extension”, “article”, “accessory”, “assembly”, “device”, “apparatus”, “product”, “unit”, “equipment”, “tool”, “method” and “kit”, as well as any other equivalent expression(s) and/or compound word(s) thereof known in the art will be used interchangeably, as apparent to a person skilled in the art. This applies also for any other mutually equivalent expressions, such as, for example: a) “standing”, “raising”, “adjusting”, “displacing”, etc.; b) “hole”, “orifice”, “passage”, “channel”, “conduit”, “path”, etc.; c) “distance”, “position”, “location”, etc.; d) “fastening”, “securing”, “locking”, “restraining”, “affixing”, “holding”, “adjusting”, “coupling”, etc. e) “depression”, “imprint”, “indentation”, “dent”, “recess”, “crater”, “hollow”, “impression”, “crater”, “basin”, etc.; as well as for any other mutually equivalent expressions, pertaining to the aforementioned expressions and/or to any other structural and/or functional aspects of the present invention, as also apparent to a person skilled in the art. Also, in the context of the present description, expressions such as “can”, “may”, “might”, “will”, “could”, “should”, “would”, etc., may also be used interchangeably, whenever appropriate, as also apparent to a person skilled in the art.

Furthermore, in the context of the present description, it will be considered that all elongated objects will have an implicit “longitudinal axis” or “centerline”, such as the longitudinal axis of shaft for example, or the centerline of a coiled spring, for example, and that expressions such as “connected” and “connectable”, or “mounted” and “mountable”, may be interchangeable, in that the present invention also relates to a kit with corresponding components for assembling a resulting fully-assembled and fully-operational shaft clamp, and/or associated chain hoist and/or counterbalancing mechanism, and/or resulting door assembly.

Moreover, components of the present system(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the optional configurations as illustrated in the accompanying drawings comprise various components and although the optional configurations of the disclosed seat as shown may consist of certain configurations as explained and illustrated herein, not all of these components and configurations are essential and thus should not be taken in their restrictive sense, i.e. should not be taken as to limit the scope of the present disclosure. It is to be understood that other suitable components and cooperations thereinbetween, as well as other suitable configurations may be used for the seat, and corresponding parts, as briefly explained, and as can be easily inferred herefrom, without departing from the scope of the disclosure.

Broadly described, and as will be explained below in relation to various embodiments, a seat apparatus (also referred to herein simply as “seat” or “apparatus”) for assisting a person with reduced mobility is provided. More particularly, the seat can be made of a compressible material shaped and configured to provide an improved posture when seated, and to facilitate moving from a seated position to a standing position, among others, in a simpler, easier, faster, more accurate, more effective, more functional, more reliable and/or more versatile manner than what is possible with other conventional devices and/or apparatus.

Following is a brief description of how the seat works and/or can be implemented according to possible embodiment(s).

Indeed, the present seat and/or other associated inventive aspects (ex. connection assembly, retaining means, method, etc.) can include one and/or several of the following possible components and features (and/or different possible combination(s) and/or permutation(s) thereof):

Indeed, according to possible embodiments, and as can be easily understood when referring to FIGS. 1 to 15, there is provided a seat apparatus 1 having a main body 7 defining a recessed region 11 configured for sitting in. The seat apparatus 1 can include a front portion 2, a rear portion 3 and lateral portions 4, along with a top portion 5 and a bottom portion 6, among other possible configurations. As will described further below, the seat apparatus 1 includes a base component 19 integrally formed with the main body 7 (e.g., FIGS. 1 to 7) or cooperating therewith as a separate component (e.g., FIGS. 8 to 15).

The seat apparatus 1 can have a height between about 15 to 25 cm, such that when it is positioned in a chair, for example, the vertical distance needed to be traveled to go from a sitting to a standing position is reduced. Therefore, the time and the force required to change positions (i.e., from sitting to standing) is also reduced. Moreover, it should be understood that the pressures on the joints of the person standing up are correspondingly, and advantageously, reduced. In some embodiments, by virtue of the design of the seat apparatus 1, the required force can be reduced up to 25%, although other configurations are possible.

Moreover, the recessed region 11 is illustratively defined within a structure of the main body 7. More specifically, the main body 7 can include a back wall 8 proximate the rear portion 3, with a pair of lateral walls 9 extending forwardly from the back wall 8 such that the recessed region 11 is defined between the back wall 8 and lateral walls 9. It will be understood that the seat apparatus 1 also includes a bottom surface 10 on which a user will be seated while using the seat. It is appreciated that the back wall 8, lateral walls 9 and bottom surface 10 are also connected to one another to form at least a portion of the main body 7. In other words, the back wall 8, lateral walls 9 and bottom surface 10 can all form part of the same structure or component (e.g., the main body 7).

Preferably, the recessed region 11 is shaped and sized to substantially match a lower posterior, or backside, of a person. In some embodiments, the recessed region 11 includes a plurality of sections for receiving and accommodating various and corresponding parts of the body.

Figure 8:
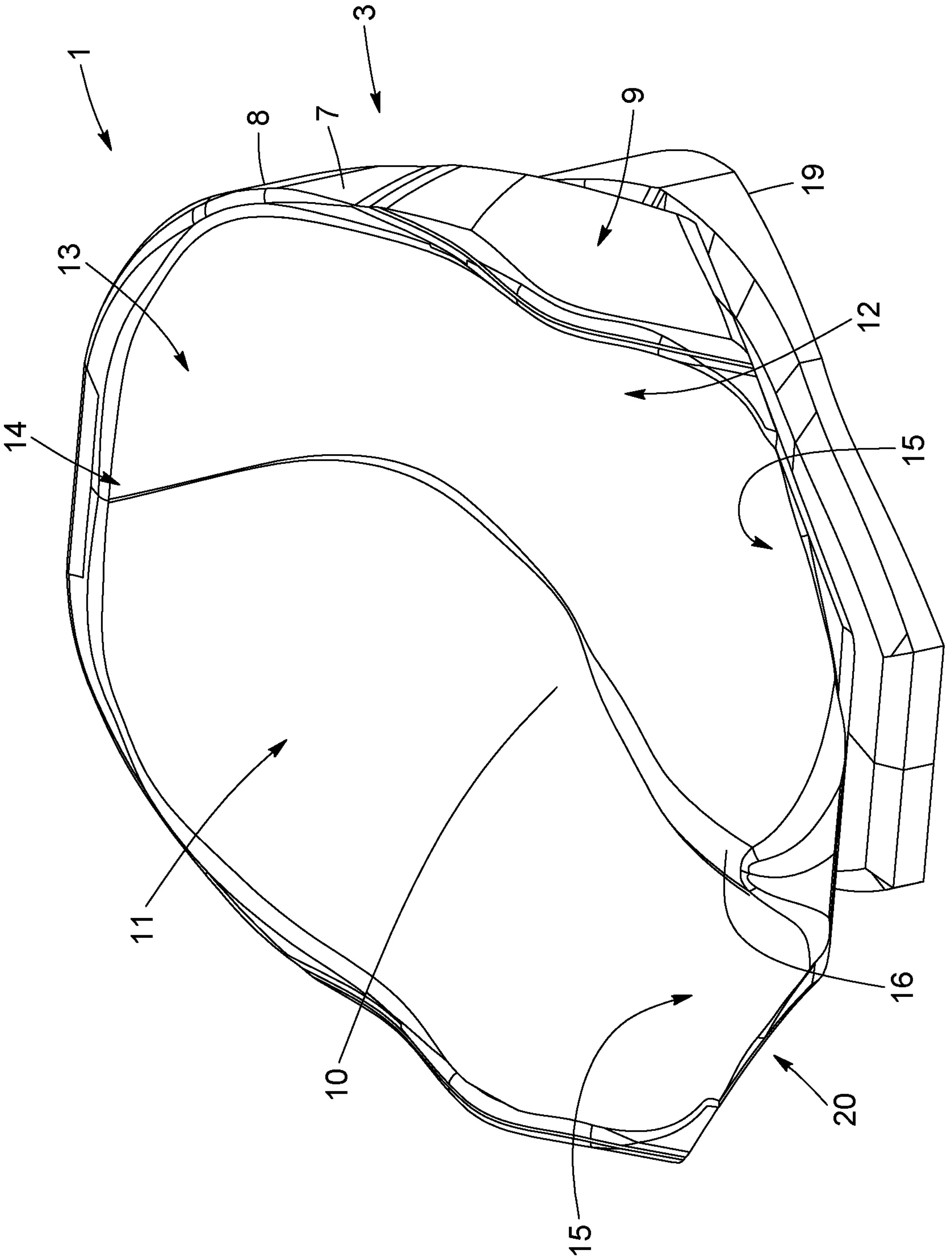
FIG. 8 is a perspective view of a seat apparatus according to another embodiment, showing the main body and base as separate components.
Figure 11:
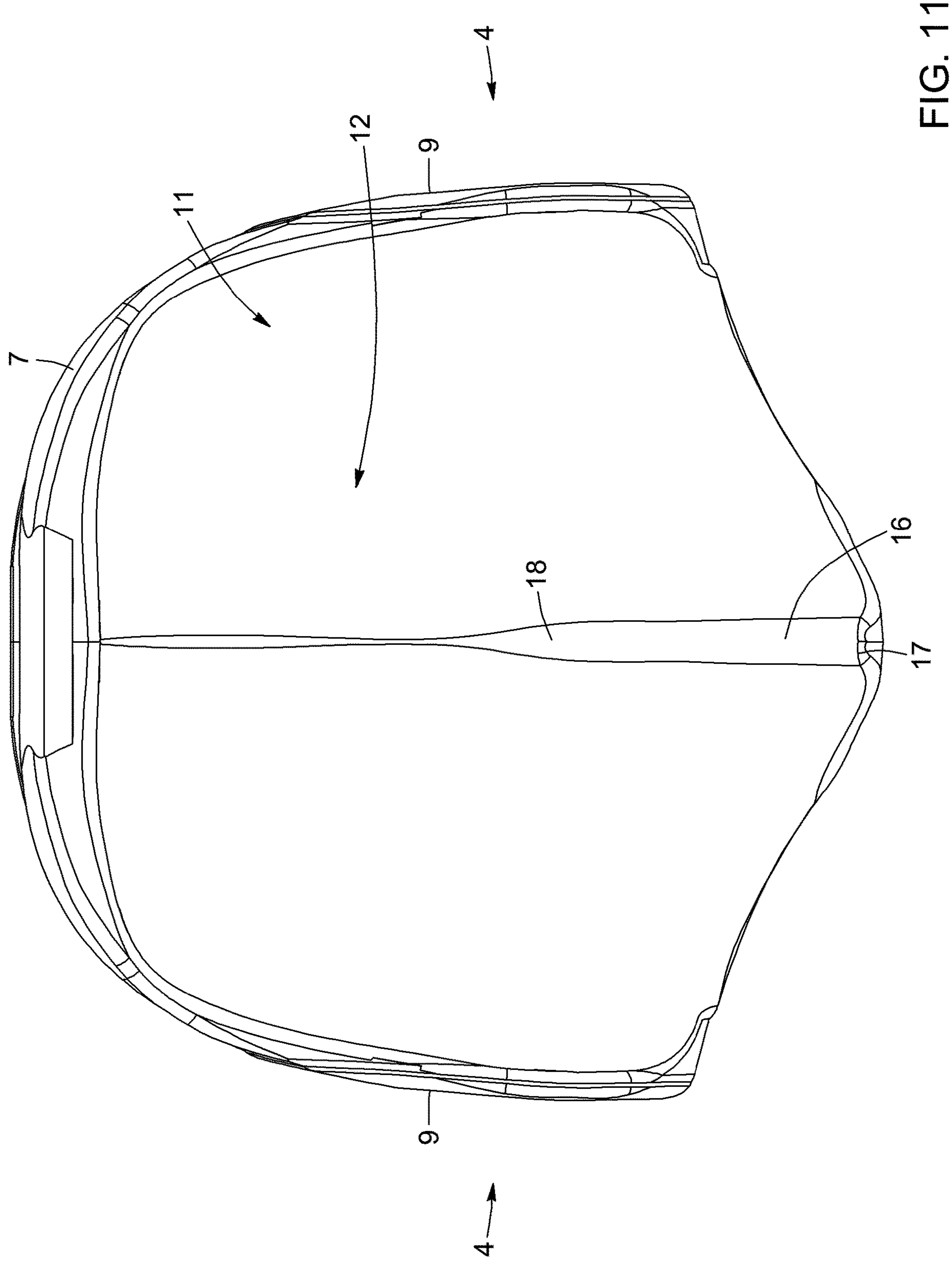
FIG. 11 is a top elevation view of the seat apparatus shown in FIG. 8, showing a seat projection extending further forwardly than the lateral walls, according to a possible embodiment.
Figure 12:
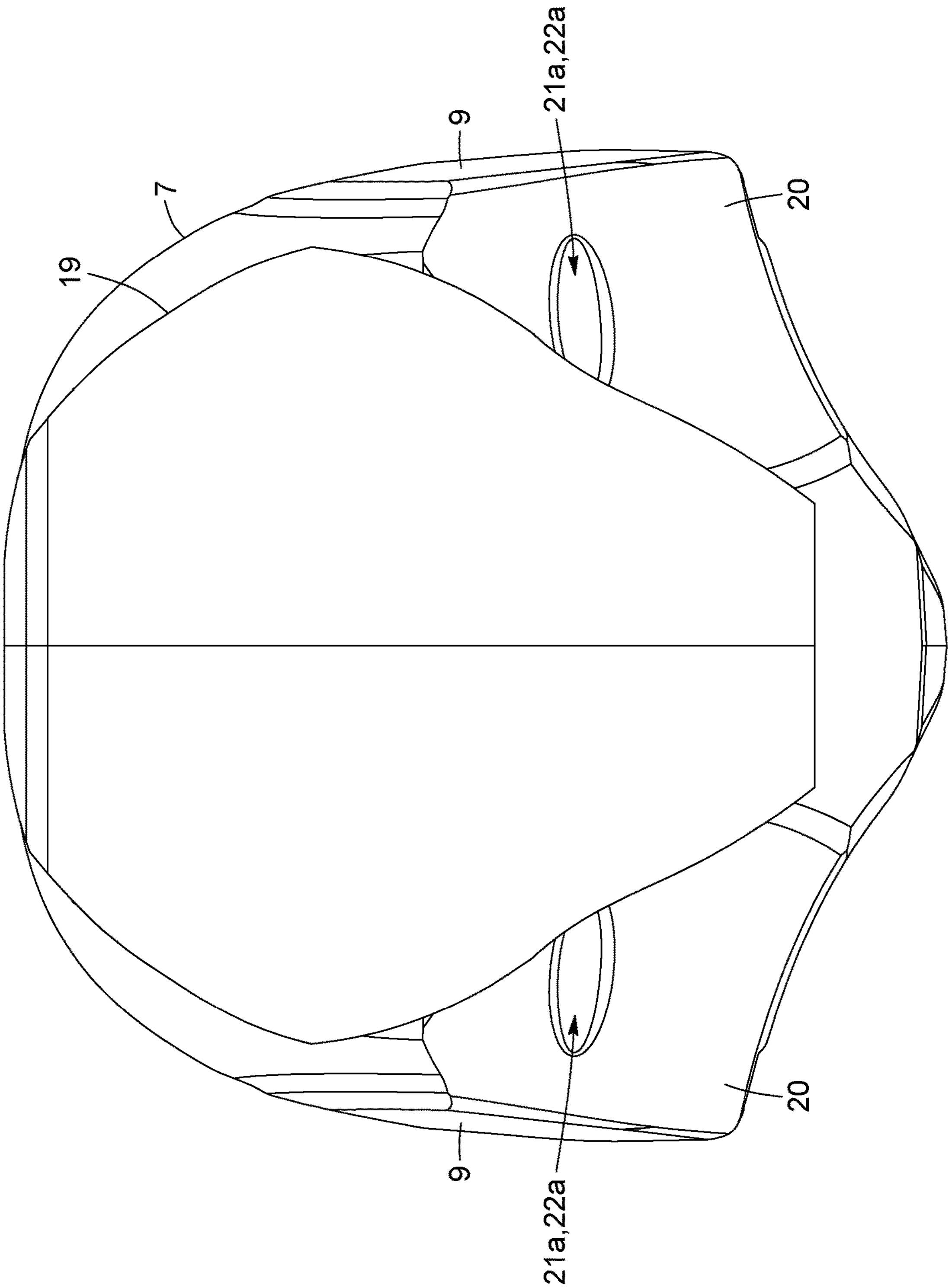
FIG. 12 is a bottom plan view of the seat apparatus according to an embodiment, showing a passage extending through the receded portion of the main body.

More particularly, in some embodiments and as seen in FIGS. 1, 8 and 11, among others, the recessed region 11 includes a buttocks section 12 proximate the rear portion 3. The buttocks section 12 can be shaped and sized for receiving the buttocks of a person. The buttocks section 12 can extend at least partially across the rear portion 3 between the lateral portions 4 (e.g., between the lateral walls 9). In addition, the buttocks portion 12 can include a portion of the bottom surface 10, a lower portion of the back wall 8 and/or a lower portion of each of the lateral walls 9.

The recessed region 11 can also include a lumbar section 13 proximate the back wall 8 and above the buttocks section 12. The lumbar section 13 can be shaped and configured to provide support to the lumbar region (i.e., the lower back) of the person using the seat. As seen in the accompanying figures, the lumbar section 13 includes a protruding component 14 adapted to contact, improve comfort and/or provide support to the lumbar region of the user. As such, the seat apparatus 1, by virtue of the configuration of the lumbar section 13, can be configured to adjust, correct and/or straighten the posture of the user.

The transition between the lumbar section 13 and buttocks section 12 can be shaped and configured to provide (or at least not hinder) comfort of the user. It is appreciated that the transition between the lumbar section 13 and buttocks section 12 is located substantially at the lower portion of the back wall 8 and/or at the rear portion of the bottom surface 10. In some embodiments, the transition between the lumbar section 13 and buttocks section 12 is curved to match the transition between a person's lower back and buttocks, proximate the tailbone for example, although other configurations are possible. The curve (or inclination) between the lumbar section 13 and buttocks section 12, in combination with the protruding component 14, can adjust the position of a person's pelvic region to increase comfort and promote proper posture.

The recessed region 11 can further include a pair of thigh sections 15 proximate the front portion 2. The thigh sections 15 are shaped and sized to receive each corresponding thigh of the user. The thigh sections 15 can extend forwardly from the buttocks section 12 between the lateral walls 9 in a manner such that the transition between the buttocks section 12 and the thigh section(s) 15 is substantially continuous (e.g., smooth, void of obstacles and/or sudden change of direction, etc.).

Figure 7:
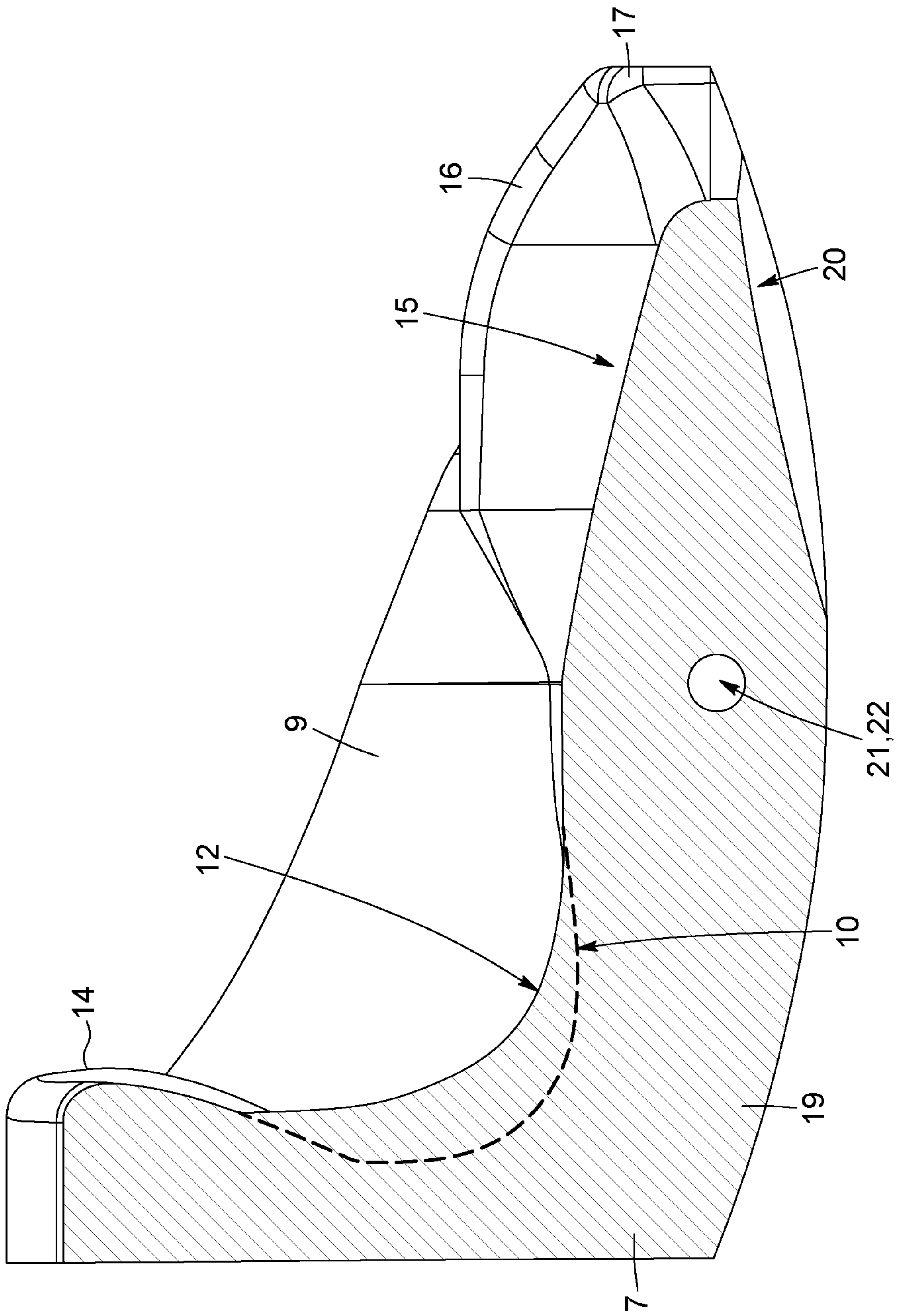
FIG. 7 is a cross-sectional view of the seat apparatus shown in FIG. 3, taken along line 7-7, showing the curve of a pair of thigh sections, according to an embodiment.
Figure 14:
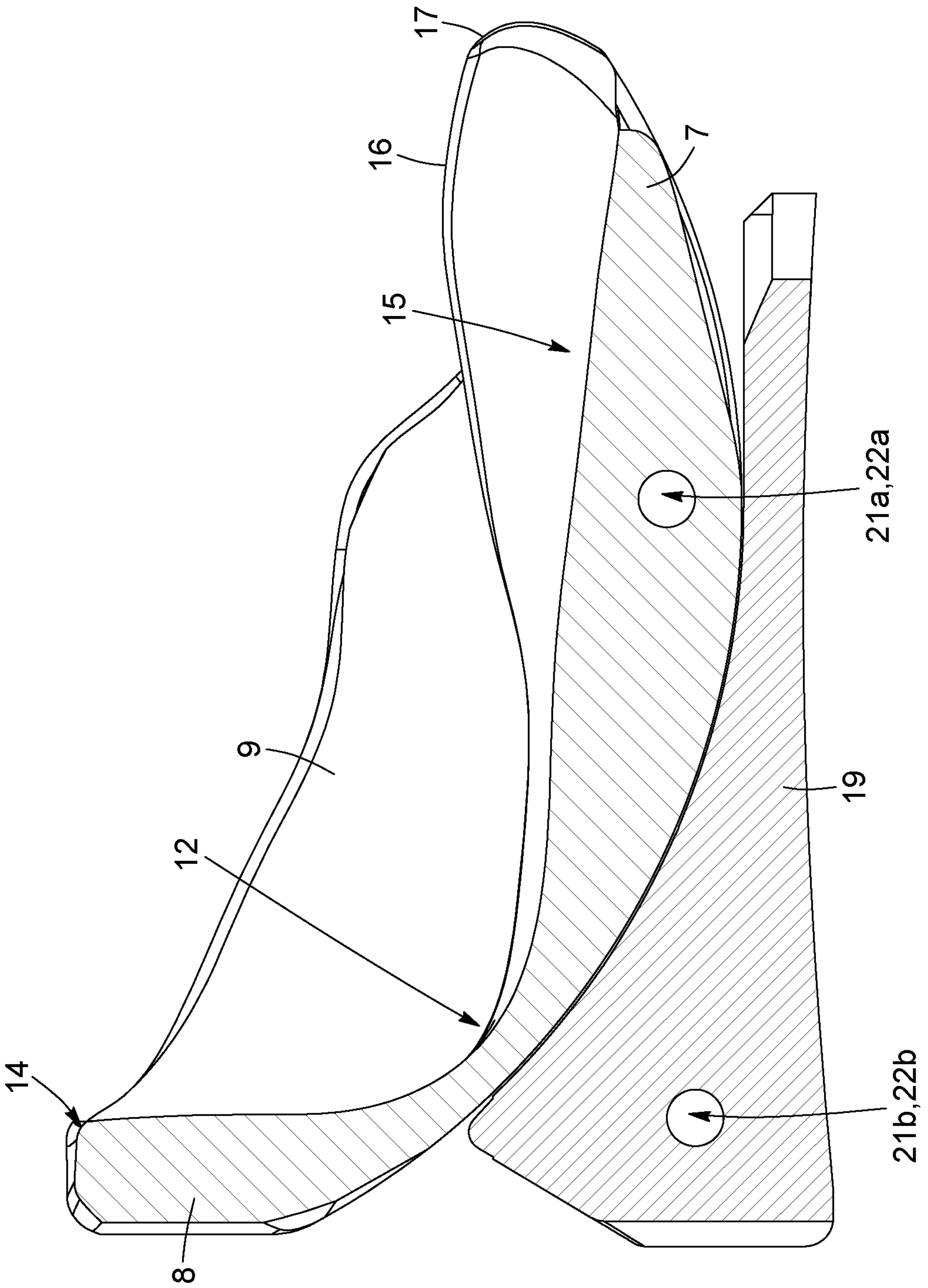
FIG. 14 is a cross-sectional view of the seat apparatus shown in FIG. 10, taken along line 14-14, showing the curve of a pair of thigh sections, according to an embodiment.

As seen in FIGS. 7 and 14, the thigh sections 15 are preferably angled downwardly to facilitate exiting the seat apparatus 1. In other words, the thigh sections 15 are shaped and sized to aid the user in moving from a seated position to a standing position, for example. The downward angle of the thigh sections 15 can be between about 1 degree and about 45 degrees relative to the bottom surface of the buttocks section 12. However, it is appreciated that other configurations are possible. For example, the thigh sections 15 can be angled downwardly by any other suitable angle(s) and/or the thigh sections 15 can be curved and/or the thigh sections 15 can be divided in two or more subsections having different angles from one another.

Now referring broadly to FIGS. 1 to 15, the main body 7 can further include a seat projection 16 located proximate the front portion 3 and extending upwardly between the thigh sections 15. The seat projection 16 can be shaped and configured to keep the thighs, and thus the knees, of a user, separated when using the seat apparatus 1 (e.g., when seated within the recessed region 11). Therefore, various injuries can be prevented, such as dislocation of the hip and/or of a hip prosthesis, for example, resulting from movement(s) which could have been prevented.

In some embodiments, the distal end 17 of the seat projection 16 (i.e., the end furthest from the back wall 8) has a width greater than that of the proximal end 18 (i.e., the end closest to the back wall, or the end opposite the distal end 17). In other words, the seat projection 16 can taper outwardly from the proximal end 18 to the distal end 17. Moreover, the distal end of the seat projection illustratively extends further than the lateral walls 9 of the main body 7. However, it is appreciated that other configurations are possible concerning the shape, size, location and orientation of the seat projection.

The seat projection 16 can be further configured to prevent certain movements (e.g., undesired and/or unwanted movements) of the user by acting as an obstacle thereto. For example, the seat projection 16 can be adapted to block and/or prevent forward movement, such as when a user slides forwardly within the recessed region 11 due to prolonged use of the apparatus 1, or simply as an accident.

Figure 6:
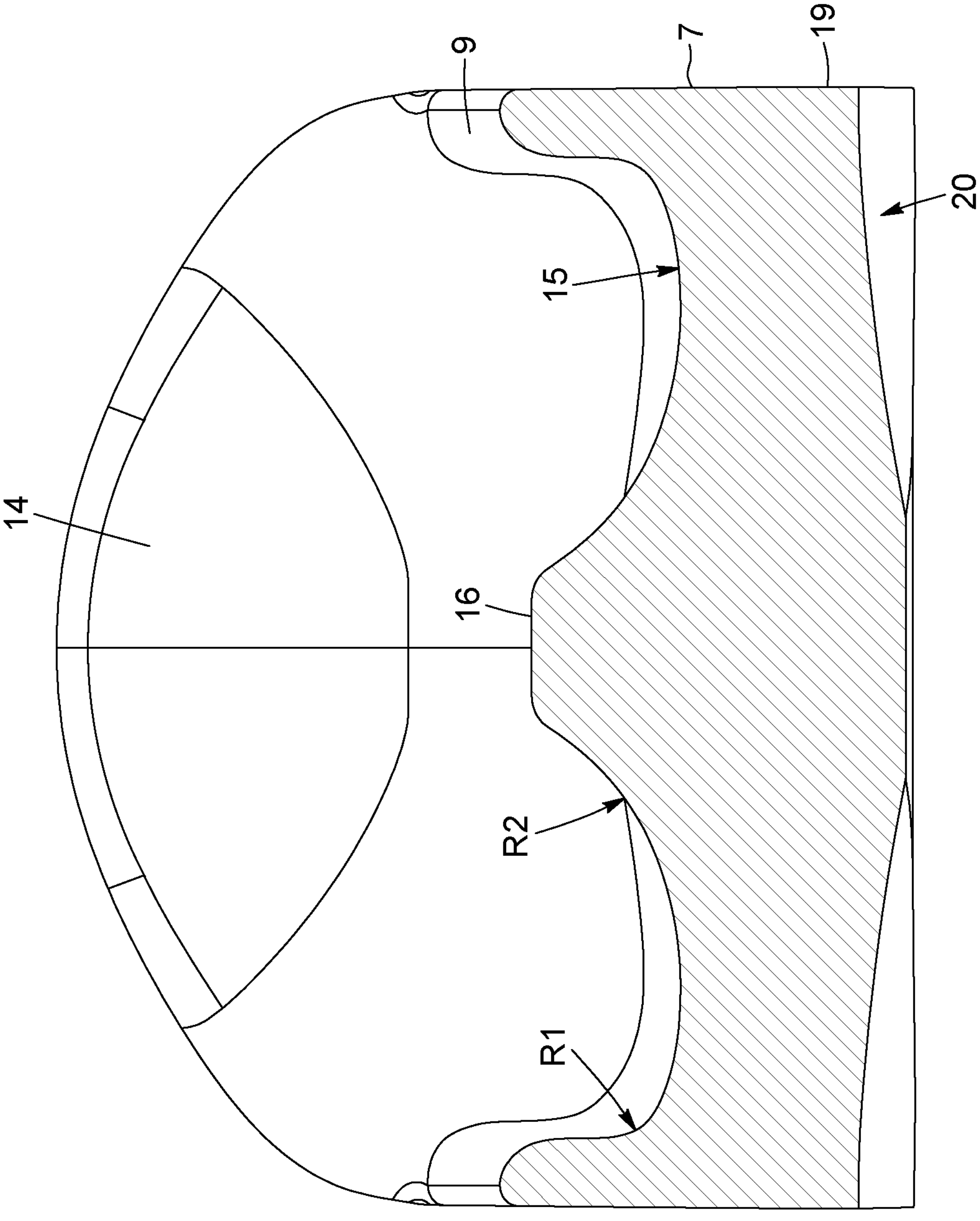
FIG. 6 is a cross-sectional view of the seat apparatus shown in FIG. 2, taken along line 6-6, showing the transition between a rear portion and a front portion, according to an embodiment.
Figure 13:
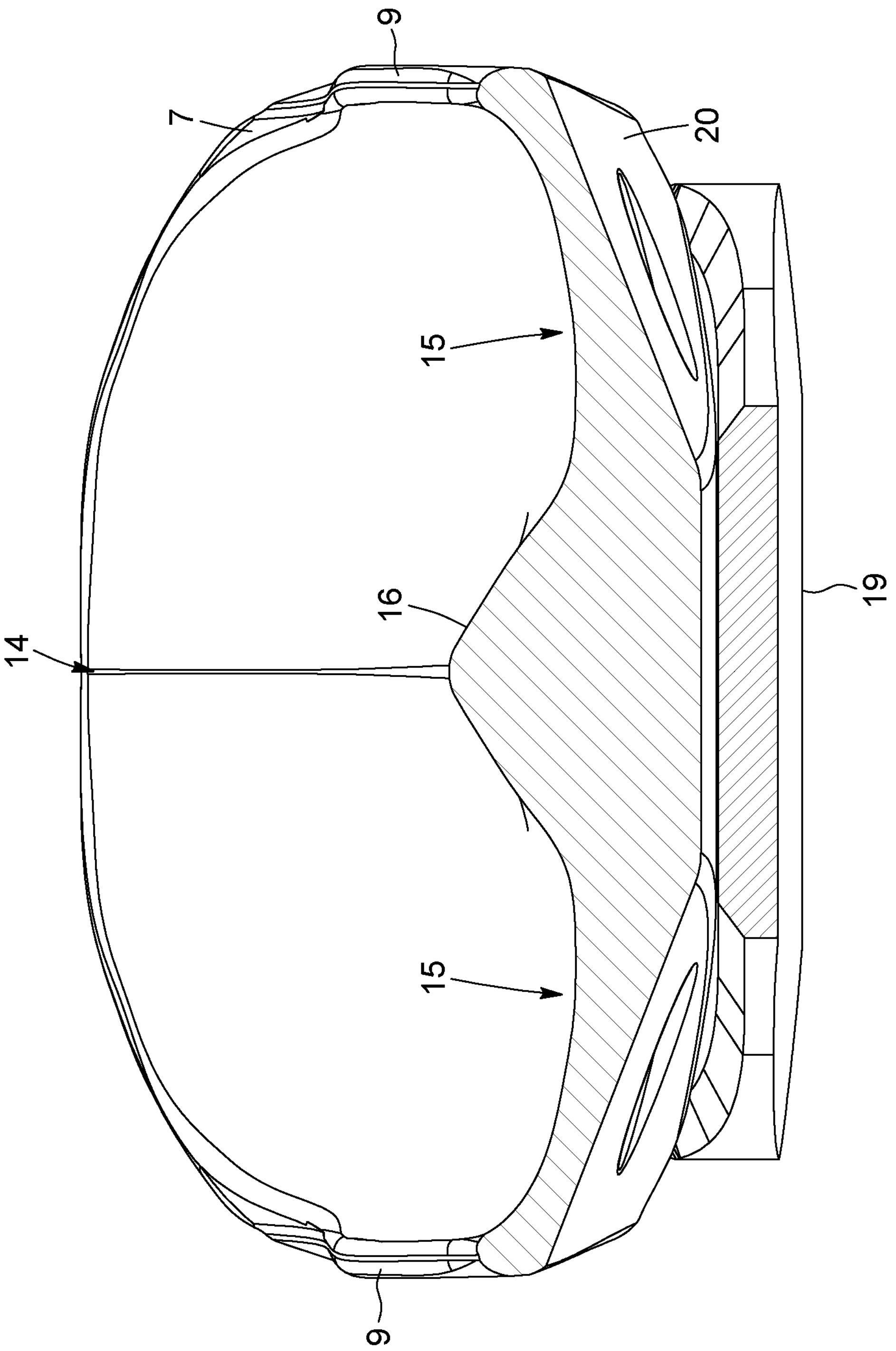
FIG. 13 is a cross-sectional view of the seat apparatus shown in FIG. 9, taken along line 13-13, showing a pair of thigh sections provided in the recessed region of the seat apparatus, according to an embodiment.

As seen in FIGS. 6 and 13, the transversal cross-section of the thigh sections 15 can be curved to substantially match the shape of a person's thighs, thus increasing comfort of the user. More particularly, each thigh section 15 can include a first curved profile (R1) between the corresponding lateral wall 9 and bottom surface 10 and/or a second curved profile (R2) between the bottom surface 10 and the seat projection 16. It should be noted that the first and second curved profiles of each thigh section can be substantially the same, or different from one another. In this embodiment, the second curved profile (R2) defines a radius greater than that of the first curved profile (R1), although it is appreciated that other configurations are possible.

It should be appreciated that the various sections of the recessed region 11 can be substantially continuous with one another such that the recessed region is void of corners and/or other uncomfortable elements.

With reference to FIGS. 1 to 8, the seat apparatus 1 can further include a base 19 provided below and connected to the main body 7. The base 19 can be adapted to come in contact with the surface on which the seat apparatus 1 is positioned, such as a floor, a chair, a car seat, a bench or any other sitting device and/or location.

The base 19 can be shaped and sized to allow the seat apparatus 1 to rock (e.g., swing, move to and fro and/or side to side, pivot about at least one axis, etc.). In some embodiments, the base 19 is generally convex, i.e., the base 19 extends downwardly from the bottom surface 10 and is curved along at least a portion thereof to allow the seat to pivot forwardly (i.e., towards the front), although it is appreciated that other configurations are possible.

The base 19 can further include receded sections 20 adapted to facilitate movement of the seat in a given direction. In the present embodiment, the base 19 includes receded front corners 20 configured to facilitate movement of the seat towards the left and/or right sides. As such, the seat apparatus 1 can be tilted sideways and/or in a general direction of one of the receded front corners 20 based on movement of the user (e.g., leaning towards one side when seated within the apparatus).

In the present embodiment, the seat apparatus 1 has a latching mechanism 21, or fastening mechanism, adapted to allow the apparatus to be fastened, or otherwise connected, to the surface or piece of furniture it is positioned on, such as a chair for example. The latching mechanism 21 can include a tunnel, or passage 22, defined through a thickness of the seat, thus allowing one or more straps to run through the passage, and connect the seat to the chair. It is appreciated that any other suitable type of latching mechanism can be used and are possible, such as a solid rod extending through the passage and having both ends being connected to the chair via straps for example.

The passage 22 of the latching mechanism 21 is preferably defined through a central point of the base 19, e.g., substantially through a center of gravity of the seat apparatus 1, and therefore in the middle of the curved/convex shape of the base 19. As such, movement of the seat (e.g., rocking back and forth, etc.) remains unobstructed despite being fastened to the chair. In some embodiments, the longitudinal axis of the passage 22 corresponds to the axis around which the seat pivots when rocking back and forth.

Figure 9:
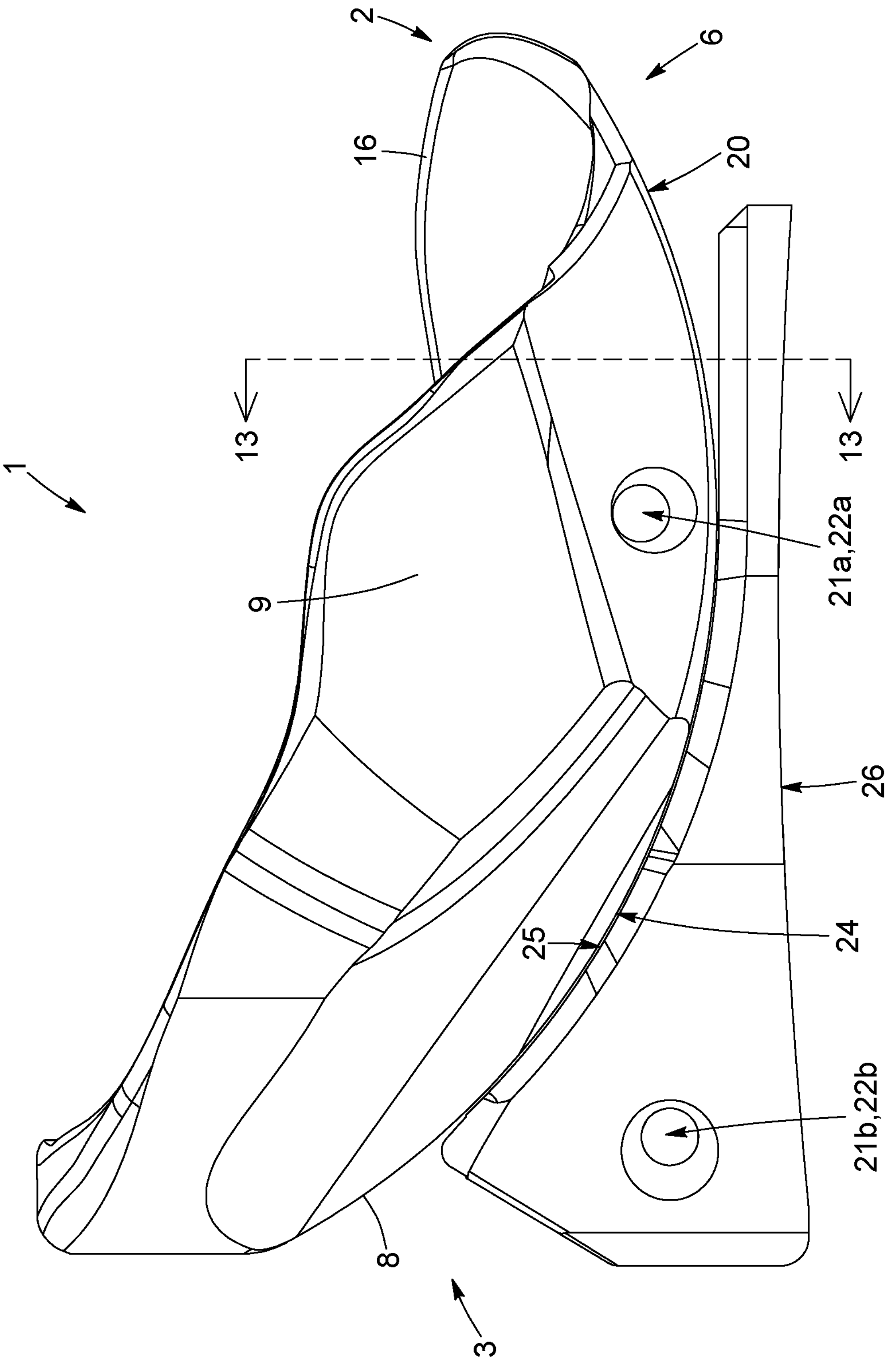
FIG. 9 is a side elevation view of the seat apparatus shown in FIG. 8, showing the main body slidably engaged with the base, according to an embodiment.

With reference to FIGS. 9 to 15, an alternative embodiment of the seat apparatus is shown, where the base 19 is a separate component from the main body 7. In this embodiment, the main body 7 is adapted to cooperate with the base 19 to facilitate a user to get up from a sitting position. The main body 7 can have a body interface 24, and the base 19 can have a base interface 25. As seen in FIG. 9, the body interface 24 is configured to engage the base interface 25 and cooperate therewith to facilitate various movements of the user. It is appreciated that the body and base interfaces 24, 25 can be complementarily shaped to enable engagement therebetween, for example, the body interface 24 can have a convex surface adapted to be cradled on a concave surface of the base interface 25, although other configurations are possible.

It should be noted that the complementarily shaped interfaces 24, 25 can enable a sliding movement of the main body 7 relative to the base 19. For example, and with reference to FIG. 9A, the main body 7 can slide upwardly along the base interface 25 when a user attempts to stand up, thereby raising the rear portion 3, tilting the front portion 2 downwardly, and urging the user to stand up.

In this embodiment, the base 19 can have a relatively flat bottom surface 26 adapted to engage the supporting surface (e.g., floor, chair, etc.) of the seat apparatus 1. In addition, in the illustrated embodiment, the main body 7 is provided with the receded sections 20 proximate the front end and below each thigh sections 15. It is noted that the complementarily shaped interfaces 24, 25, combined with the receded sections 20 on the main body 7 and the added height of the base 19, enables a rocking movement of the main body 7 on the base 19, which in turn facilitates forward movement of the user within the seat to ultimately stand up with more ease. It is appreciated that the rocking movement can also facilitate the sliding motion of the main body 7 upon the base 19 to urge the user to stand up, as described above.

Figure 15:
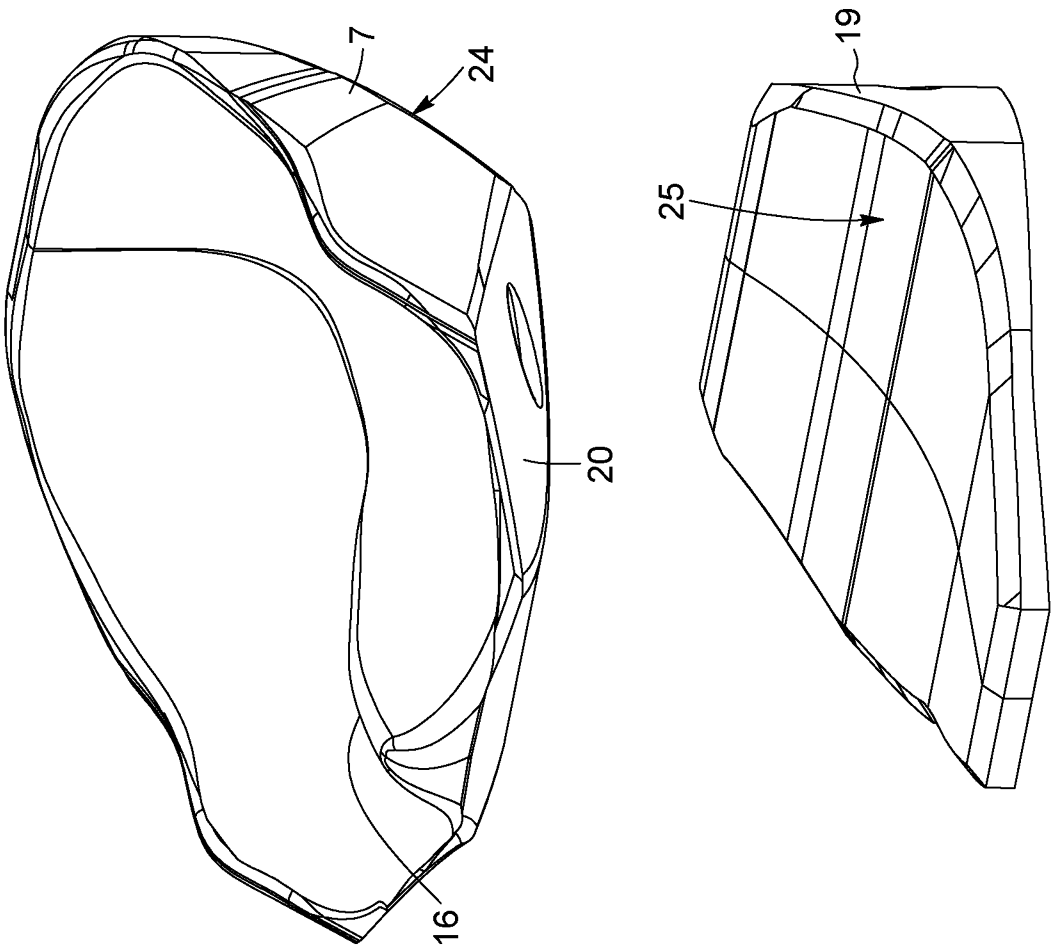
FIG. 15 is an exploded front perspective view of the seat apparatus shown in FIG. 8, showing the base having a forward section which is narrower than the thickness of the main body, according to an embodiment.

As best seen in FIGS. 9 and 15, the base 19 includes a rear base portion 28 and a forward base portion 30 extending from the rear base portion 28. The forward base portion 30 is illustratively narrower than the rear base portion 28 such that the front section 2 of the main body 7 overhangs on either side of the forward base portion 30. It should be noted that the portion of the main body 7 which overhangs the forward base portion 30 corresponds to the receded portions 20 such that rocking the main body on the base 19 is further facilitated. Moreover, the main body 7 can be tilted sideways and/or in a general direction of one of the receded portions 20 based on movement of the user (e.g., leaning towards one side when seated within the apparatus).

Referring broadly to FIGS. 9 to 15, the latching mechanism can include a main body latching mechanism 21*a* and a base latching mechanism 21*b* adapted to allow the apparatus to be fastened, or otherwise connected, to the surface or piece of furniture it is positioned on, such as a chair for example. In this embodiment, the main body 7 is provided with a body passage 22*a* adapted to receive a strap, for example, to fasten the main body 7 atop the base 19. The base 19 can be provided with a base passage 22*b* adapted to receive another strap, for example, to fasten the base 19 to the surface below. It should be noted that the main body 7 can be fastened to the base 19 via a strap extending through the body passage 22*a*. Alternatively, or additionally, the main body 7 can be fastened to the surface below the base 19 via straps, and simply rest within the cradle of the base interface 25. Moreover, additional straps can be used to extend through both the body passage 22*a* and the base passage 22*b*, thus linking both components together.

Figure 9A:
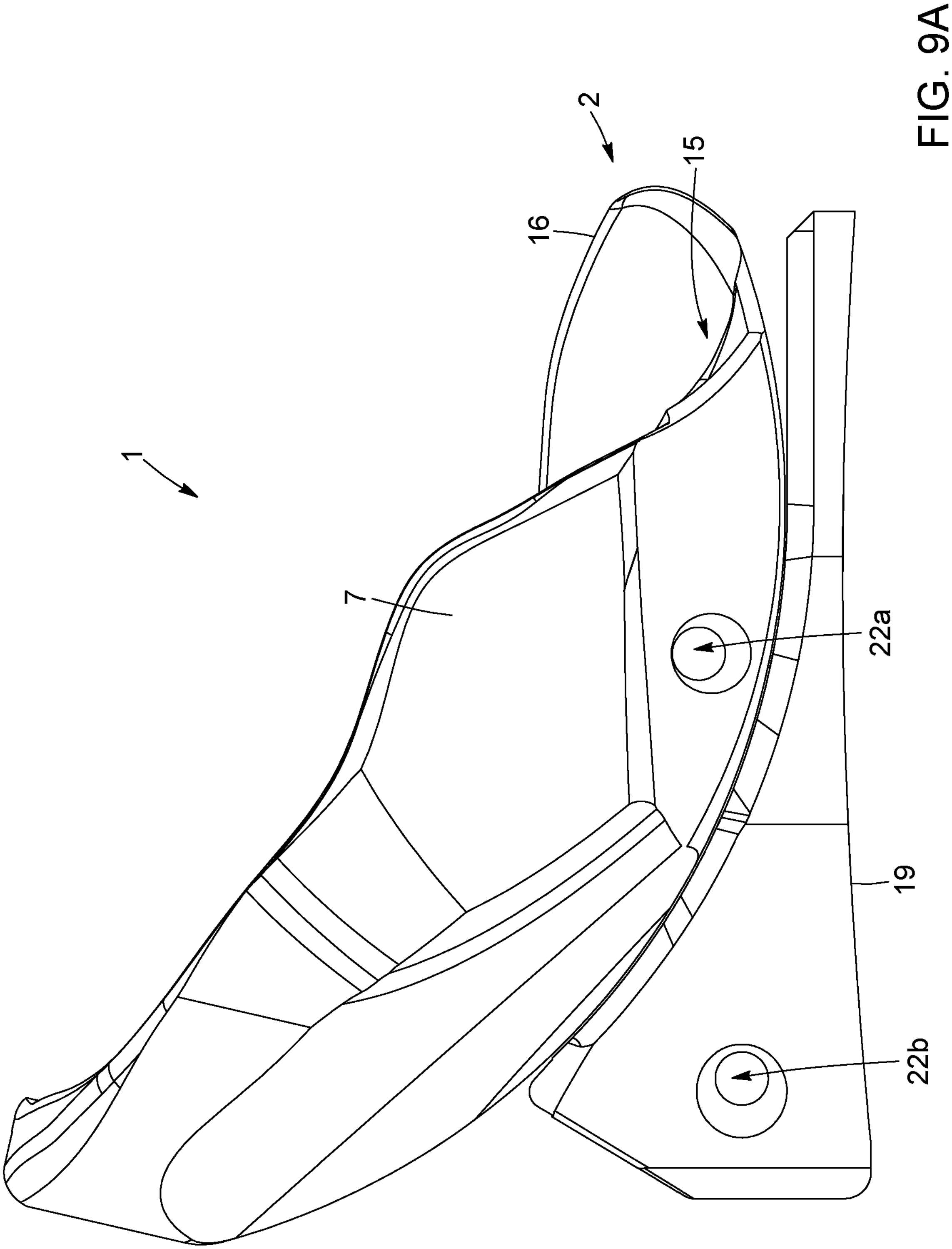
FIG. 9A is a side elevation view of the seat apparatus shown in FIG. 8, showing the main body in an upward position, according to an embodiment.
Figure 10:
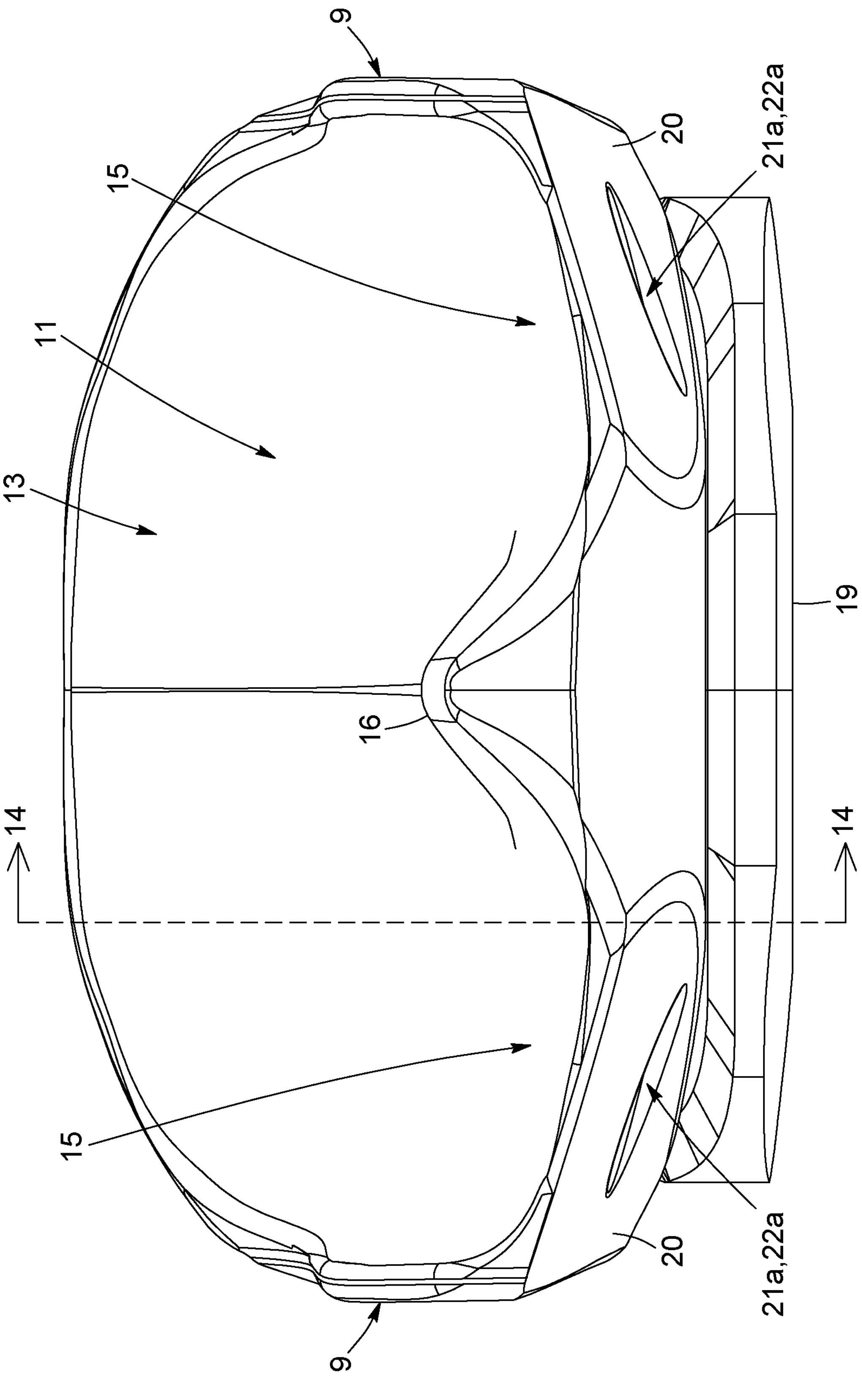
FIG. 10 is a front elevation view of the seat apparatus shown in FIG. 8, showing the main body provided with receded portions proximate a front thereof, according to an embodiment.

It should be understood that the latching mechanism 21 can include other types of fasteners/connectors than straps, and that the latching mechanism 21 can be adapted to allow (or at least not prevent) the sliding movement of the main body 7 on the base 19. Furthermore, the latching mechanism 21 is preferably adapted to keep the base 19 relatively stable and immobile on the surface supporting the seat apparatus 1. As seen in FIGS. 9 and 9A, the body passage 22 extends through a thickness of the body 7 proximate the receded portions 20, i.e., proximate the front portion 2 and below the thigh sections 15. On the other hand, the base passage 22*b* extends through a thickness of the base proximate the rear base portion 28, which corresponds, in this embodiment, to the bulkiest portion of the base 19. It is appreciated that the passages 22*a*, 22*b* can be straight, curved or a combination thereof.

Referring broadly to FIGS. 1 to 15. in some embodiments, the lateral portions 4 of the seat 1 can be substantially symmetrical relative to one another such that both sides of the seat are relatively identical. The seat can be customized (i.e., custom-made) for a specific person or group of people. For example, one or more molds can be made from measurements taken from said person or group of people to facilitate manufacturing of the main body 7, the base 19, or both, and increase comfort provided from the use of the apparatus by this(these) person(s).

The present seat apparatus 1 and corresponding parts are preferably made of the same material to facilitate manufacturing, although separate parts can be made from different materials. For example, the walls of the seat (e.g., the back wall 8 and/or the lateral walls 9), the bottom surface 10 and the seat projection 16 can be made from a first material, and the base 19 can be made from a second material. The material of the base can be more resilient as it can be required to withstand the weight of the user while balancing on the supporting surface (e.g., floor, chair, etc.). Preferably, the materials can be chosen such that friction forces between the main body 7 and the base 19 are less than the friction forces between the base 19 and the supporting surface (e.g., chair) such that the main body 7 can slide along the base 19 while the base remains generally stationary.

In some embodiments, the seat and corresponding parts are preferably made of compressible, adaptable and/or ergonomic material. Preferably, the material is not deformable (e.g., plastic deformations) such as to prevent damages or breaking of the seat, therefore increasing the lifespan of the seat apparatus 1. For example, the seat apparatus 1 can be made of XL extralight Tech. Eva Foam, Polyurethane, Polyester Elastomer(s), Polyphenylene Ether or any other suitable material or combination thereof.

The present device therefore provides several advantages over conventional devices and/or apparatus in that: a) the height of the seat can reduce the required force/energy for a person to lift themselves to stand up (e.g., from a sitting position); b) the need to use limbs other than the legs to stand up (e.g., arms) is eliminated, or at least reduced; c) the posture of the person using the seat is adjusted/corrected to increase comfort; d) the height of the seat decreases the vertical distance traveled while standing up by about 25%; e) the elevated state of the seat positions the hips and knees in a more ergonomic position prior to standing (e.g., the knees are less bent); f) etc.

The above-described device can be useful in assisting a patient with their physical rehabilitation. It can also address the issue related to the lack of resources and staff in rehabilitation centers and/or hospitals, including caregivers, nurses, rehabilitation technicians and therapists. In addition, the apparatus would have a potential positive impact on the length of stay of people through the facilitation of the initial mobilization, and could thus reduce post-operative complications in the medium term such as dislocations of prostheses, falls, muscle wasting, etc.

It is worth mentioning that several modifications could be made to the present device and corresponding components, without departing from the scope of the present invention. For example: a) preferred embodiment of the seat apparatus is made of a deformable, but non-compressible material, however, other materials, or combination(s)/process(es) could be used; b) the shape, location, orientation and number of the passage of the latching mechanism could vary; c) the latching mechanism can alternatively, or additionally, include rear strap(s) connectable to the back wall, or to any other suitable location; d) the number, size and type of fastener(s), or combination thereof, could vary to accommodate different sizes of the seat; e) the recessed region dimensions and/or shape could be different; f) etc.

As may now be better appreciated, the present invention is advantageous in that it provides for a seat apparatus for assisting a person with reduced mobility in a more efficient, more precise, more accurate, more reliable, more adjustable, more versatile, more adaptable, more ergonomic and/or more desirable manner, than what is possible with other existing conventional devices.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing from the scope and spirit of the present invention, as apparent to a person skilled in the art.

The invention claimed is:

1. A seat apparatus for facilitating movement of a user from a sitting position to a standing position, the seat apparatus comprising:

a main body comprising a bottom surface, a back wall and a pair of lateral walls, the bottom surface, back wall and lateral walls being connected together and defining a recessed region configured for sitting in, the main body further comprising a seat projection extending upwardly from the bottom surface between the lateral walls, the seat projection being shaped and adapted to maintain thighs of a user separated on either side thereof; and a base provided below the main body and adapted to cooperate therewith, at least one of the base and main body comprising a convex and curved cross-sectional profile adapted to allow the apparatus to pivot about at least one axis in order to tilt the main body forward and urge a user in the standing position, the main body comprising a body interface, and the base comprising a base interface, the body interface being adapted to slidably engage the base interface, wherein the main body comprises at least one receded portion adapted to allow the main body to tilt in the direction of the at least one receded portion.

2. The seat apparatus according to claim 1, wherein the base comprises at least one receded portion proximate a front of the seat apparatus adapted to allow the main body to tilt in the direction of the at least one receded portion.

3. The seat apparatus according to claim 1, wherein the recessed region includes a lumbar section proximate the back wall, a buttocks section provided below the lumbar section and adapted to receive a buttocks of a user, and a pair of thigh sections extending forwardly from the buttocks section and adapted to receive thighs of the user.

4. The seat apparatus according to claim 3, wherein the lumbar section comprises a protruding component adapted to contact and support a lumbar region of the user when sitting in the seat apparatus.

5. The seat apparatus according to claim 3, wherein the seat projection is located between the thigh sections.

6. The seat apparatus according to claim 1, wherein the seat projection extends forwardly further than the lateral walls.

7. The seat apparatus according to claim 1, wherein the base comprises a forward base portion, and wherein the receded portion of the main body comprises a pair of receded portion overhanging on either side of the forward base portion.

8. The seat apparatus according to claim 1, wherein the body interface is generally convex and the base interface is generally concave and adapted to cradle the body interface.

9. The seat apparatus according to claim 1, wherein the base interface and body interface are complementarily shaped.

10. The seat apparatus according to claim 1, further comprising a latching mechanism configured to fasten the seat apparatus to a supporting surface, the latching mechanism comprising:

a passage extending transversely through at least one of the main body and the base; and a fastener adapted to extend through the passage for fastening the seat apparatus to supporting surface.

11. The seat apparatus according to claim 10, wherein the passage extends through a center of gravity of the apparatus.

12. The seat apparatus according to claim 10, wherein the passage is a body passage adapted to extend through a thickness of the main body, and wherein the latching mechanism further comprises a base passage extending through a thickness of the base, each passage being adapted to receive respective fasteners for connecting the main body, the base and the supporting surface to one another.

13. A seat apparatus for facilitating movement of a user from a sitting position to a standing position, the seat apparatus comprising:

a main body comprising a bottom surface, a back wall and a pair of lateral walls, the bottom surface, back wall and lateral walls being connected together and defining a recessed region configured for sitting in, the main body further comprising a seat projection extending upwardly from the bottom surface between the lateral walls, the seat projection being shaped and adapted to maintain thighs of a user separated on either side thereof;

a base provided below the main body and adapted to cooperate therewith, at least one of the base and main body comprising a convex and curved cross-sectional profile adapted to allow the apparatus to pivot about at least one axis in order to tilt the main body forward and urge a user in the standing position; and a latching mechanism configured to fasten the seat apparatus to a supporting surface, the latching mechanism comprising:

a passage extending transversely through at least one of the main body and the base; and a fastener adapted to extend through the passage for fastening the seat apparatus to supporting surface, wherein the passage is a body passage adapted to extend through a thickness of the main body, and wherein the latching mechanism further comprises a base passage extending through a thickness of the base, each passage being adapted to receive respective fasteners for connecting the main body, the base and the supporting surface to one another.

14. The seat apparatus according to claim 13, wherein the main body comprises a generally convex body interface, and the base comprises a generally concave base interface, and wherein the body interface is adapted to slidably engage the base interface.

* * * * *